United States Patent [19]

Ohki

[11] Patent Number: 5,122,653

[45] Date of Patent: Jun. 16, 1992

[54] CONFOCAL TYPE LASER SCAN MICROSCOPE WITH INTEGRATED ILLUMINATION, DETECTION AND WAVEGUIDE SYSTEM

[75] Inventor: Hiroshi Ohki, Yokohama, Japan

[73] Assignee: Nikon Corporation, Tokyo, Japan

[21] Appl. No.: 564,741

[22] Filed: Aug. 9, 1990

[30] Foreign Application Priority Data

Aug. 22, 1989 [JP]  Japan .................................. 1-215606

[51] Int. Cl.$^5$ .............................................. H01J 3/14
[52] U.S. Cl. ............................... 250/216; 250/227.20; 359/368
[58] Field of Search ................. 250/234-236, 250/216, 227.26, 227.20; 350/507, 527

[56] References Cited

U.S. PATENT DOCUMENTS 4,802,748  2/1989  McCarthy et al. ................. 350/507
4,884,881  12/1989  Lichtman et al. ................. 350/527

Primary Examiner—David C. Nelms
Assistant Examiner—K. Shami
Attorney, Agent, or Firm—Shapiro and Shapiro

[57] ABSTRACT

A confocal type laser scan microscope comprises a substrate including a first channel wave guide having a first end and having the other end connected to a connecting port of a mode splitter, a second channel wave guide having a second end and having the other end connected to the mode splitter and a third channel wave guide having a third end and having the other end connected to the connecting port of the mode splitter; a laser diode connected to the first end for supplying a light to the first channel wave guide; a microscope optical system arranged at the second end which is conjugate with a sample surface relative to the microscope optical system; and a photo-detector connected to the third end for detecting the light from the second end.

10 Claims, 2 Drawing Sheets

CONFOCAL TYPE LASER SCAN MICROSCOPE WITH INTEGRATED ILLUMINATION, DETECTION AND WAVEGUIDE SYSTEM

BACKGROUND OF THE INVENTION

1. Field of the Invention

The present invention relates to a microscope, and more particularly to a confocal type laser scan microscope.

2. Related Background Art

A prior art confocal type laser scan microscope comprises a microscope optical system as well as a laser beam illumination system and a photo-detecting system for detecting a light from a sample surface. The design is such that a laser beam emitting point and a corresponding point of a co-focus aperture (pinhole) of the photo-detecting system are at conjugate positions relative to the microscope optical system.

In the prior art confocal type laser scan microscope, the laser beam illumination system and the photo-detecting system for detecting the light from the sample surface are separately required in addition to the microscope optical system. Thus, the optical system is large in size and complex. Further, because the laser beam emitting point and the corresponding point of the co-focus aperture (pinhole) of the photo-detecting system must be at the conjugate positions, a long time is required to position them.

SUMMARY OF THE INVENTION

It is an object of the present invention to provide a confocal type laser scan microscope which is of small size and does not require positioning of a pinhole.

In order to achieve the above object, the confocal type laser scan microscope of the present invention comprises a substrate 10 on which wave guide means is formed; the wave guide means including a mode splitter 14 for splitting light to first mode light and second mode light, a first channel wave guide 13 having a first end 13a and having the other end connected to a connecting port of the mode splitter 14, a second channel wave guide 15 having a second end 15a and having the other end connected to the mode splitter 14 and a third channel wave guide having a third end 17a and having the other end connected to the connecting port of the mode splitter 14; light source means 11 connected to the first end 13a for supplying light to the first channel wave guide 13; a microscope optical system 2 provided at the second end 15a; the second end 15a and a sample surface 3 being conjugate relative to the microscope optical system 2; and photo-detection means 18 connected to the third end 17a for detecting the light from the second end 15a.

In accordance with the present invention, the illumination system and the photo-detecting system of the laser scan microscope are integral. Accordingly, a very small optical system may be assembled. Further, since a end plane of a channel wave guide serves as the laser emitting spot and the confocal aperture, no pinhole positioning is required.

DESCRIPTION OF THE PREFERRED EMBODIMENTS

Figure 1:
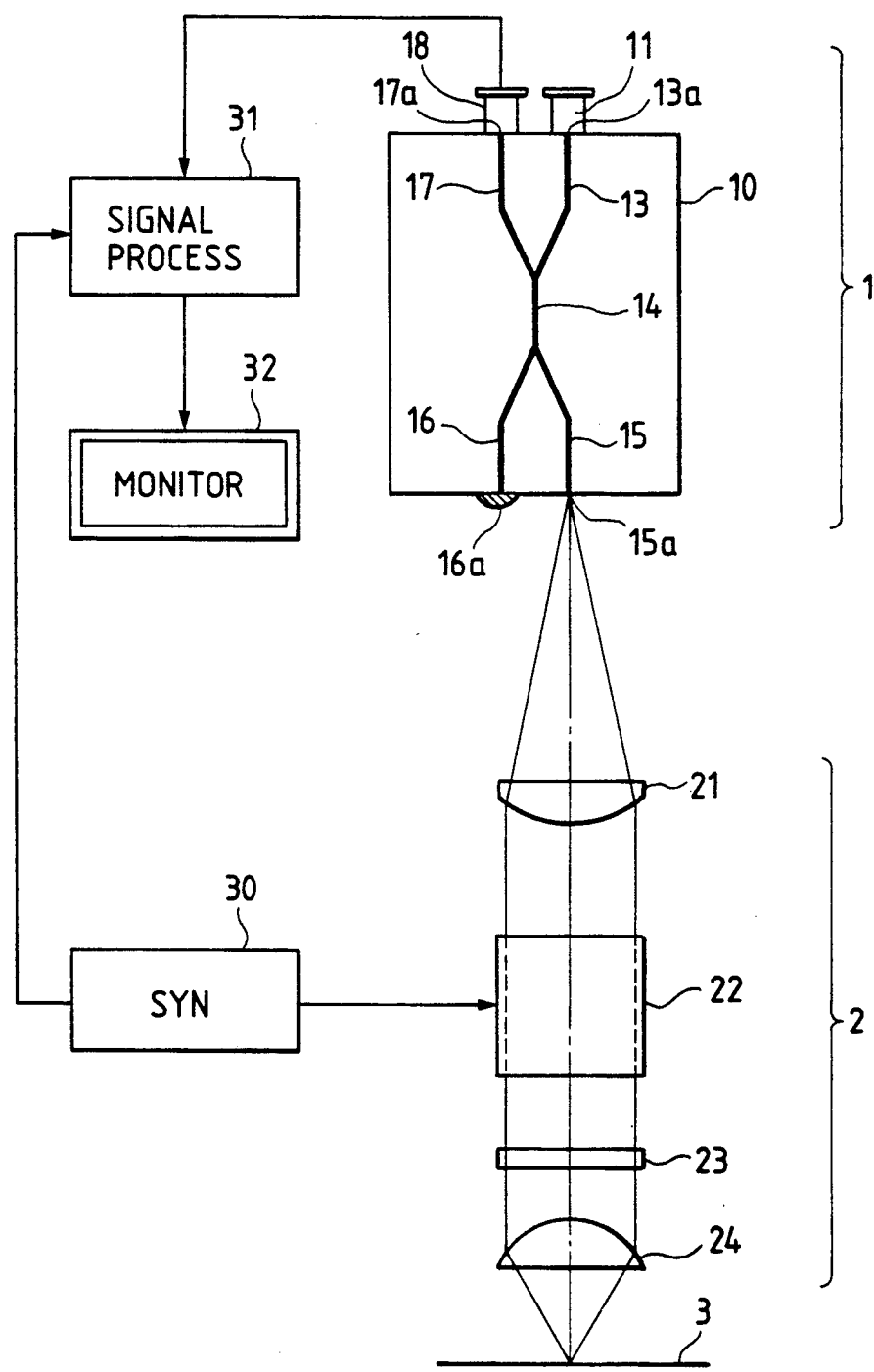
FIG. 1 shows diagrammatically a configuration of the present invention.

FIG. 1 shows an embodiment of the present invention which incorporates an optical wave guide device 1 having a light source and a photo-detecting system attached thereto, and a microscope optical system 2 having a quarter wavelength plate 23 assembled therein.

In the optical wave guide device 1, numeral 11 denotes a laser diode, numerals 13, 15, 17 and 16 denote first, second, third and fourth single mode channel wave guides, respectively formed on a substrate 10, numeral 14 denotes a mode splitter, and numeral 18 denotes a photo-detector.

In the microscope optical system 2, numeral 21 denotes a collimator lens, numeral 22 denotes an X-Y beam scanning device, numeral 23 denotes a quarter wavelength plate, and numeral 24 denotes an objective lens.

The laser diode 11 is disposed such that light is directed to an end 13a of the first single mode channel wave guide. In order to direct the light to the first single mode channel wave guide 13, light of a He-Ne laser may be focused to the end 13a of the first single mode channel wave guide, but for purpose of reducing size, it is preferable to join the laser diode 11 directly to the end 13a of the first single mode channel wave guide.

The light of the first single mode channel wave guide is split into TE mode light (whose polarization plane oscillates in the plane of the drawing) and TM mode light (whose polarization plane oscillates normally to the plane of the drawing). The light transmitted through the first single mode channel wave guide 13 passes through a mode splitter 14 and is guided to the second single mode channel wave guide 15. The mode splitter 14 is a conventional device which transmits one of the TE mode light and the TM mode light of the light directed from the first single mode channel wave guide 13 to the second single mode channel wave guide 15, and directs the other of the TE mode light and the TM mode light to the fourth single mode channel wave guide 16. A light absorbing member 16a is arranged at an end of the fourth single mode channel wave guide 16 so that the directed light is not reflected but absorbed by the light absorbing member 16a.

The laser beam is emitted from an end 15a of the second single mode channel wave guide and directed to the microscope optical system 2. The laser beam directed to the microscope optical system 2 reaches a sample surface 3 through the collimator lens 21, the X-Y beam scanning device 22, the quarter wavelength plate 23 and the objective lens 24 sequentially. The light reflected by the sample surface 3 goes back through the X-Y beam scanning device 22 and the collimator lens 21 and is redirected to the second single mode channel wave guide 15 through the end 15a of the second single mode channel wave guide. The polarization plane of the light has been rotated by 90 degrees by the function of the quarter wavelength plate 23 so that the light has been converted to the other of the TE mode light and the TM mode light. Accordingly, the light is directed by the mode splitter 14 to the third single mode channel wave guide 17 and reaches the photodetector 18, but it is not directed to the first single mode channel wave guide 13 and the return light is not directed to the laser diode 11.

It is preferable that the quarter wavelength plate 23 is placed in a collimated light beam as closely to the sample surface 3 as possible in order to prevent flare by the optical members and avoid effects due to the phase difference in the mirror system.

The light strength signal detected by the photodetector 18 is translated to a two-dimensional image signal by a signal processing circuit 31 in synchronism with the scan of the beam scanning device 22 by a synchronizing circuit 30, and the image is displayed on a monitor 32.

Figure 2:
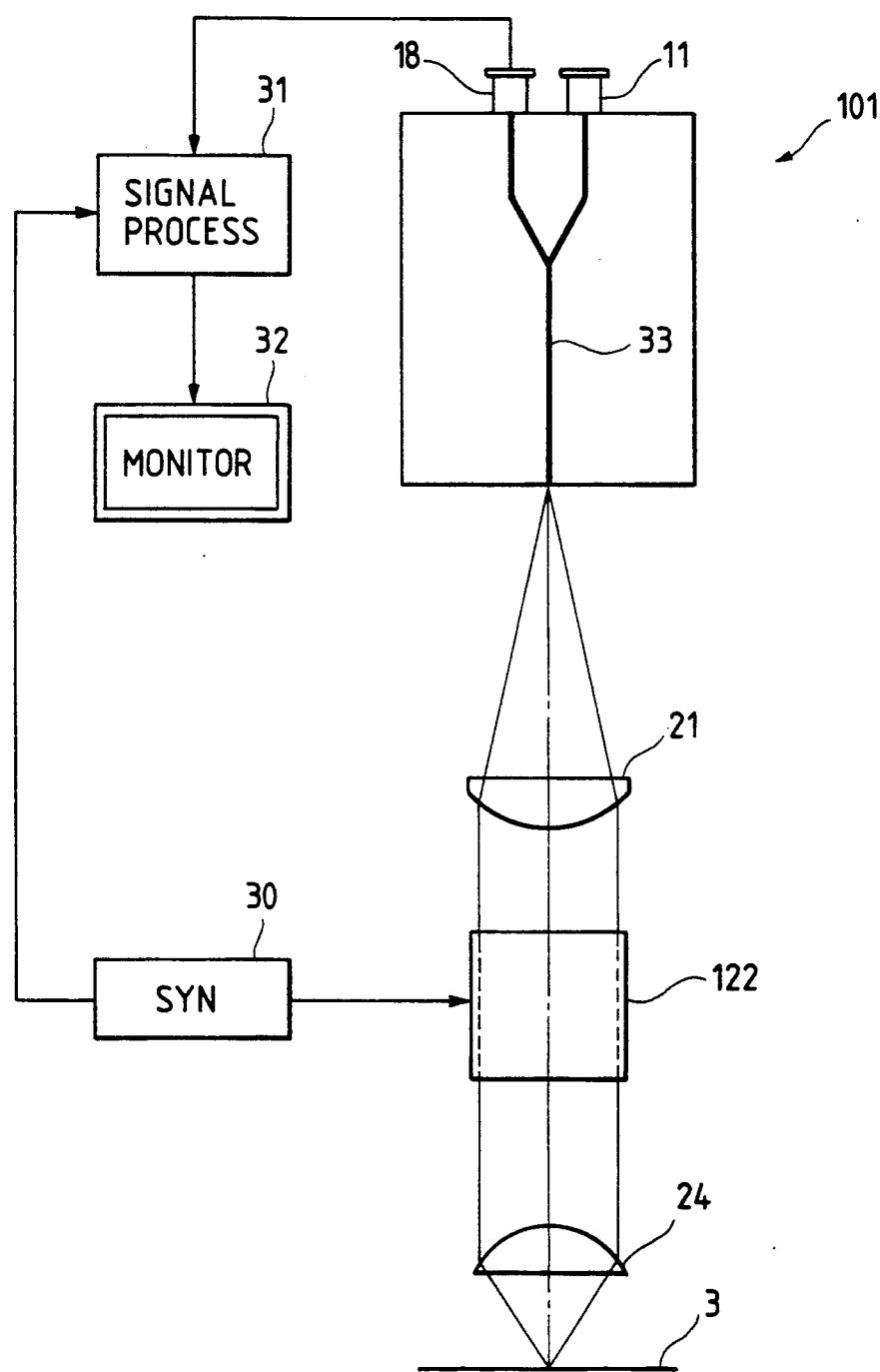
FIG. 2 shows diagrammatically a configuration of another embodiment of the present invention.

As shown in FIG. 2, where the scanning device 122 has a polarization characteristic and the quarter wavelength plate 23 cannot be used, the quarter wavelength plate 23 is removed and the mode splitter 14 may be replaced by a mere Y branch wave guide (power splitter) 33.

In accordance with the present invention, the illumination system and the photo-detecting system of the laser scan microscope are integrated so that a very small optical system may be assembled. Further, since the end plane of the single mode channel wave guide serves as the emitting laser spot and the co-focus aperture, no pinhole positioning is required.

Where a compound semiconductor such as GaAs or InP is used as the substrate of the optical wave guide device, the laser diode which serves as the light source and the photo-detector may be monolithically integrated on one substrate so that size reduction and simplification are further attained.

I claim:

1. A confocal type laser scan microscope comprising:
   a substrate having wave guide means formed thereon;
   said wave guide means including a mode splitter for splitting light into a primary mode light and a secondary mode light, a first channel wave guide having a first end and having the other end connected to a connecting port of said mode splitter, a second channel wave guide having a second end and having the other end connected to said mode splitter, and a third channel wave guide having a third end and having the other end connected to said connecting port of said splitter;
   light source means connected to said first end for supplying light to said first channel wave guide;
   a microscope optical system arranged at said second end;
   said second end and a sample surface being conjugate relative to said microscope optical system; and
   photo-detection means connected to said third end for detecting the light from said second end.

2. A confocal type laser scan microscope according to claim 1 wherein said microscope optical system includes a collimator lens and an objective lens.

3. A confocal type laser scan microscope according to claim 1 wherein said wave guide means further includes a fourth channel wave guide having a fourth end and having the other end connected to a junction of said mode splitter and said second channel wave guide, and light absorbing means connected to said fourth end for absorbing secondary mode light split by said mode splitter from the light supplied by said light source means.

4. A confocal type laser scan microscope according to claim 1 wherein said light source means includes a laser diode.

5. A confocal type laser scan microscope according to claim 1 wherein said mode splitter sends the primary mode light of said first channel wave guide to said second channel wave guide.

6. A confocal type laser scan microscope according to claim 1 wherein said first, second and third channel wave guides are single mode channel wave guides.

7. A confocal type laser scan microscope according to claim 1 wherein said substrate having said wave guide means formed thereon is a compound semiconductor, and said light source means and said photo-detector means are monolithically integrated on said substrate.

8. A confocal type laser scan microscope according to claim 3 wherein said fourth channel wave guide is a single mode channel wave guide.

9. A confocal type laser scan microscope according to claim 1 wherein said microscope optical system includes scanning means for relatively scanning the light emitted from said second end and the sample surface.

10. A confocal type laser scan microscope according to claim 9 further including means for forming a two-dimensional image from the light detected by said photo-detection means in synchronism with the scan of said scanning means.

* * * * *